July 28, 1959 — L. COTMAN — 2,896,241
CLEANING DEVICE
Filed Oct. 23, 1957
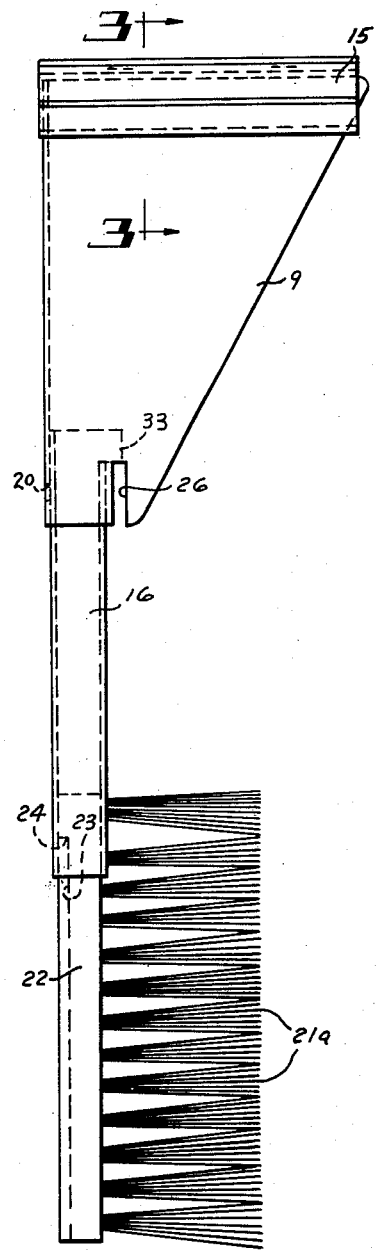
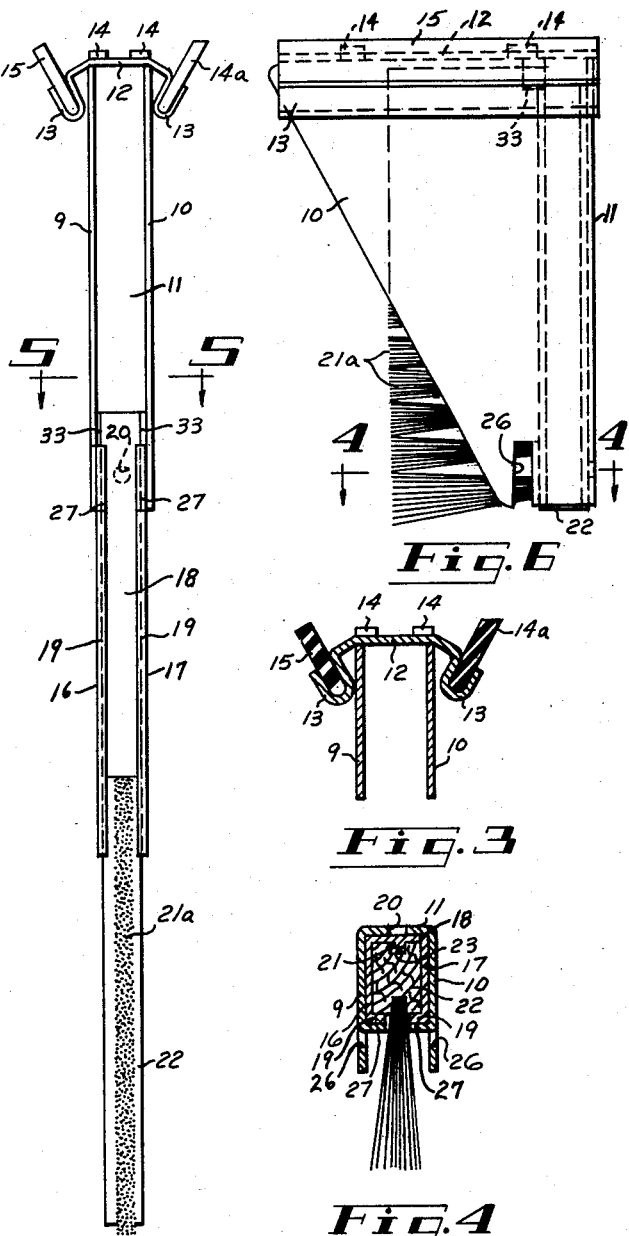
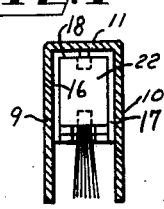
INVENTOR.
LAWRENCE COTMAN
BY Donnelly, Mentag & Harrington
ATTORNEYS

2,896,241
CLEANING DEVICE

Lawrence Cotman, Detroit, Mich.

Application October 23, 1957, Serial No. 691,907

4 Claims. (Cl. 15—184)

My invention relates to a new and useful improvement in a cleaning device adapted for cleaning surfaces such as glass and the like. The invention is particularly adapted for use in cleaning the windshield and windows of an automobile body.

It is an object of the present invention to provide a cleaning device of this class which is simple in structure, economical in manufacture, durable, compact, highly efficient in use, and easily and quickly operated.

Another object of the invention is the provision in a cleaning device of this class having a holding body on which is mounted a brush which may be moved easily and quickly into operative and inoperative position.

Another object of the invention is the provision in a cleaning device of this type of a holding part having scraping members projecting outwardly from one end thereof.

Other objects will appear hereinafter.

It is recognized that various modifications and changes may be made in the details of the structure illustrated without departing from the invention and it is intended that the present disclosure shall be considered to be but the preferred embodiment.

Forming a part of this application are drawings in which:

Fig. 1 is a side elevational view of the invention;

Fig. 2 is a bottom plan view of the invention;

Fig. 3 is a fragmentary sectional view taken on the line 3—3 of Fig. 1;

Fig. 4 is a fragmentary sectional view taken on the line 4—4 of Fig. 6;

Fig. 5 is a fragmentary sectional view taken on the line 5—5 of Fig. 2;

Fig. 6 is an elevational view of the invention showing it in retracted form.

As shown in the drawings, I provide a rigid body which serves as a holding portion and which is provided with oppositely disposed side walls 9 and 10 and a bottom wall 11, the structure being trough-shaped in cross section.

A plate 12 is mounted on one of the open ends. Projected through the plate 12 are tongues 14 extending from the edges of the walls 9 and 10 and these tongues are flattened over on the plate 12, as is clearly shown in Fig. 2 and in Fig. 3. The plate 12 is provided at its opposite edges with a doubled over gripping portion 13. Secured by one of these gripping portions 13 is a rigid plate 14a which serves the purpose of scraping. It is particularly useful in scraping heavy frost from the windows of an automobile body. Contained in the other gripping portion 13 and rigidly held is a flexible plate 15 preferably formed of rubber or other flexible material so that this plate would serve as a means for removing the excess moisture from glass surfaces.

Slidable between the plates 9 and 10 at the bottom thereof and resting on the bottom wall 11 is a slide member having oppositely disposed walls 16 and 17 and the rear wall 18, as clearly shown in Fig. 4. Each of the side walls 16 and 17 is provided with an inturned flange 19. A hole 20 is drilled through the bottom wall 11 and a tongue 21 is punched inwardly from the wall 18 of the slide member to engage in the longitudinal groove 23 formed in the back face of the brush-back 22. This groove 23 does not extend the full length of the brush-back 22, as clearly shown in Fig. 1, but terminates inwardly from the end thereof to provide a shoulder 24 against which the inwardly punched tongue 21 may engage, this tongue 21 riding into the groove 23. This brush-back 22 is provided with bristles 21a. The slide member embraces the brush-back 22 and the inturned flanges 19 engage the front face of the brush-back 22 so that the brush is thus slidable in the slide member and this slide member is slidable between the walls 9 and 10.

Formed in each of the side walls 9 and 10, adjacent the front forward ends, is a slot 26 which is formed by pressing inwardly the tongues 27 clearly shown in Fig. 4. The flanges 19 on the slide member do not extend the full length thereof but terminate inwardly from the inner end of the slide member so that the side walls 16 and 17 of the slide member project beyond the flanges 19 to provide the tongues 33.

When the slide member is moved outwardly into the position shown in Fig. 1, these tongues 33 will engage the inwardly turned flanges 27 and limit the outward movement of this slide member outwardly from between the walls 9 and 10. Consequently, the slide member slides inwardly and outwardly between the walls 9 and 10 and the brush member slides lengthwise of the slide member. In this way movement of the brush inwardly and outwardly of the holding part is guided and a smooth and easy movement is effected. When the brush is moved inwardly to its fully thrust position, as shown in Fig. 6, the end faces of the back 22 of the brush will abut against the face of the end plate 12, and in this way the sliding movement of the brush is limited in such direction.

When the device is assembled as shown in the drawings, a very efficient cleaner for glass surfaces such as the windshield and windows of an automobile is provided. The rigid scraping member 14a will serve to remove heavy frost or other solid matter which may be adhering to the glass surfaces. The use of the brush has been found quite effective in brushing from the glass surfaces the frost which has been removed or loosened by the scraping member 14a.

What I claim is:

1. A cleaning device of the class described, comprising: a holding member substantially trough-shaped in cross-section and embodying a pair of spaced apart walls; an end wall mounted on said side walls for closing one end thereof; a trough-shaped slide member mounted between said walls and slidable therebetween and embodying a pair of oppositely disposed side walls; an inwardly turned flange on the upper adjacent edges of said last named side walls; a brush embodying a back, said back being slidably mounted between said side walls of said slide member and engaged at one of its faces by said last named inwardly turned flanges; said back having a longitudinal groove terminating inwardly from one end thereof; and a tongue punched from said slide member and engaging in said groove for limiting outward movement of said brush from between said second named side walls.

2. A cleaning device of the class described, comprising: a holding member substantially trough-shaped in cross section and embodying a pair of spaced apart walls; an end wall mounted on said side walls for closing one end thereof; a trough-shaped slide member slidably mounted between said walls and embodying a pair of oppositely disposed side walls; an inwardly turned flange on the upper edge of each said last named side walls; a brush embodying a back, said back being slidably mounted between said last named side walls and engaged at one of its faces by said last named inwardly turned flanges, said back having a longitudinal groove terminating inwardly from one end thereof; a tongue punched from said slide member and engaging in said groove for limiting outward movement of said brush from between said last named side walls; the back of said brush engaging the face of said end wall upon being fully thrust inwardly between said first named side walls.

3. In a cleaning device of the class described, comprising: a holding member trough-shaped in cross section and having a pair of spaced apart side walls; a trough-shaped slide member positioned between said side walls and having a pair of oppositely disposed side walls; an inwardly turned flange on the edge of each of said last named side walls; and a tongue punched inwardly from each of said first named side walls and engaging the flanges of said second named side walls.

4. In a cleaning device of the class described, comprising: a holding member trough-shaped in cross section and having a pair of spaced apart side walls; a trough-shaped slide member positioned between said side walls and having a pair of oppositely disposed side walls; an inwardly turned flange on the edge of each of said last named side walls; a tongue punched inwardly from each of said first named side walls and engaging the flanges of said second named side walls; and a tongue on said slide member engageable with the inwardly punched tongue on said side walls for limiting outward movement of said slide member relatively to said side walls.

References Cited in the file of this patent
UNITED STATES PATENTS

| | | |
|---|---|---|
| 2,517,029 | Ridner | Aug. 1, 1950 |
| 2,620,500 | Ridner | Dec. 9, 1952 |